Dec. 20, 1966   J. L. RUBRICIUS   3,292,582
SMALL ANIMAL CAGE
Filed June 21, 1965   2 Sheets-Sheet 2
FIG 2
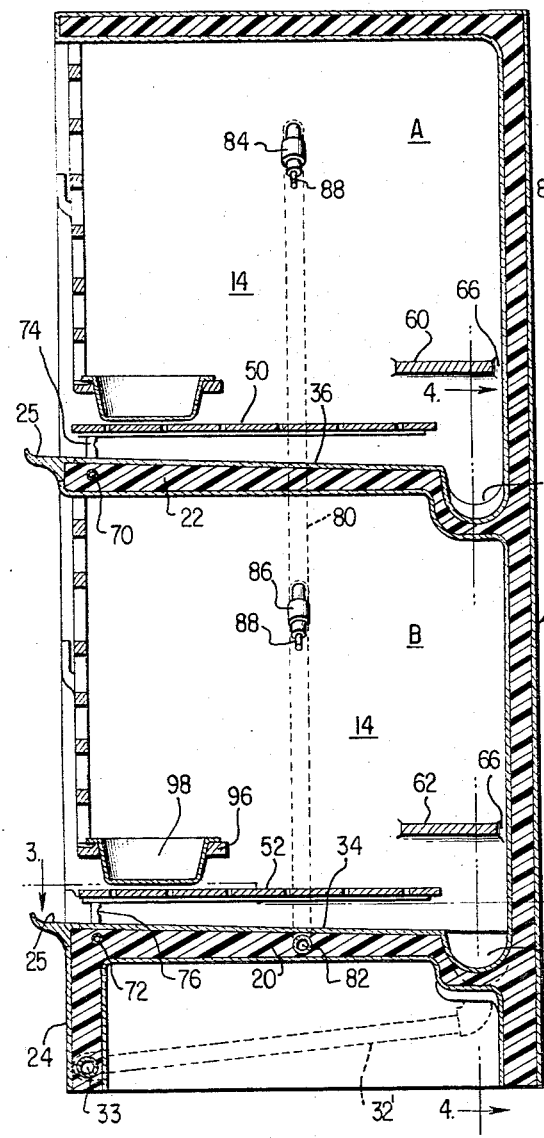
FIG. 3
FIG. 4
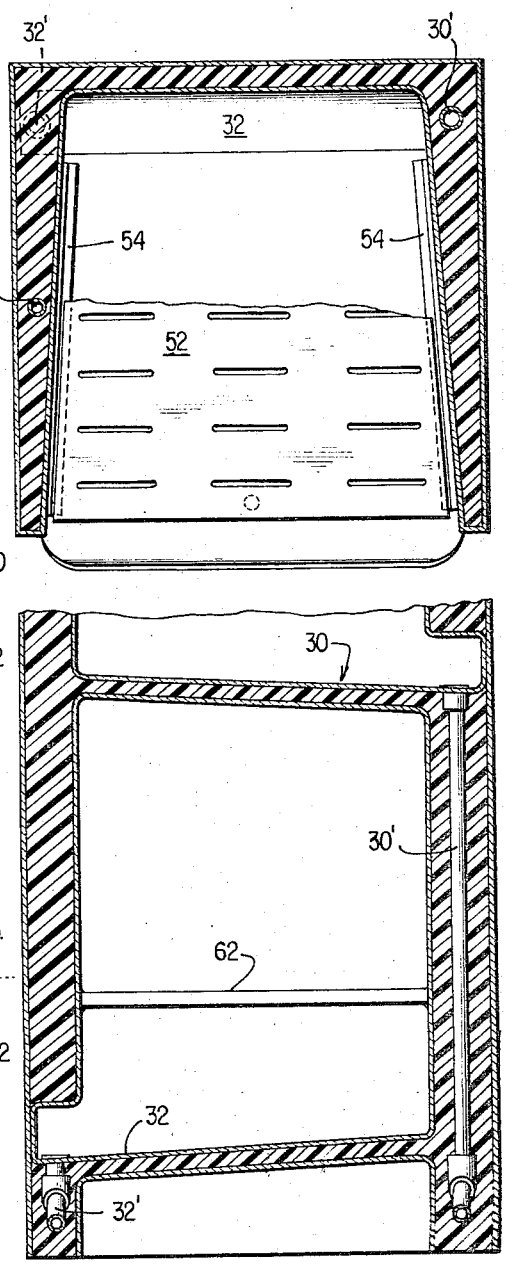
INVENTOR
JEANETTE L. RUBRICIUS
BY *Stowell & Stowell*
ATTORNEYS.

United States Patent Office 3,292,582
Patented Dec. 20, 1966

3,292,582
SMALL ANIMAL CAGE
Jeanette L. Rubricius, 85—35 Midland Parkway,
Jamaica, N.Y. 11432
Filed June 21, 1965, Ser. No. 465,485
2 Claims. (Cl. 119—17)

This invention relates to cages and in particular to improvements in small animal cages or housing units.

It is a particular object of the present invention to provide a small animal housing unit consisting of at least a pair of superimposed cages having integrally formed side, top, bottom and back walls.

It is a further object of the present invention to provide such a small animal housing unit having improved drain means with floors sloping to said drain means whereby the housing unit may be conveniently maintained sanitary and odor free.

A further object is to provide such a housing unit which may be readily assembled in side-by-side relationship to further units whereby all of the side-by-side units are provided with a common drainage system, and wherein further units may be positioned in back-to-back relationship therewith.

A further object is to provide a housing unit which when assembled with further housing units may be conveniently sealed together thereby eliminating cracks and spaces for the collection of foreign matter and the resulting generation of unpleasant odors.

Another object is to provide an improved small animal housing unit having novel floor cleaning spray units, and individual animal operated liquid dispensing means.

Another object is to provide a small animal housing unit that is light in weight, sturdy in construction, relatively inexpensive to construct, and is readily maintained in a sanitary odor-free condition.

A further object is to provide a small animal housing unit consisting of a pair of superimposed cages including means for preventing the animals for getting into their cage drainage means and wherein drainage from plural cages flows at least in part through a common drain system while drainage from each cage flows in concealed manner through succeeding cages on the common drain system.

A further object is to provide an improved small animal housing unit consisting of at least a pair of superimposed cages wherein floor means of said cages project forwardly beyond the front wall of the cages to reduce to a minimum drainage and cleaning splash from the cages to the surrounding area.

These and other objects and advantages of the present invention are provided in a small animal housing unit comprising top, side and back walls, a lower floor member joined to said back and side walls and spaced from the lower extremities thereof, a generally transverse partition member joined to the side and back walls and spaced intermediate the top and lower floor member, a trough formed in the floor member and in the partition member, said troughs extending across the back wall of the housing unit and sloping toward opposite side walls, internal pipe means connecting the low end of each trough with a common drain pipe extending across the front of the lowermost unit interiorally of the front wall thereof, the upper surface of the floor member and said partition member sloping downwardly from the front edge thereof to the respective trough, and separate grille means extending between the top and side walls and the partition member and between the partition and floor member and the side walls, each of said grille means including an openable section permitting access into the housing unit.

The invention will be more particularly described with reference to the accompanying drawings wherein:

FIG. 2 is a vertical sectional view on line 2—2 of the small animal housing unit shown in FIG. 1;

FIG. 3 is a section substantially along line 3—3 of one of the cages of the housing unit shown in FIG. 2 with a portion of the false floor removed; and FIG. 4 is a section substantially on line 4—4 of FIG. 2.

Figure 1:
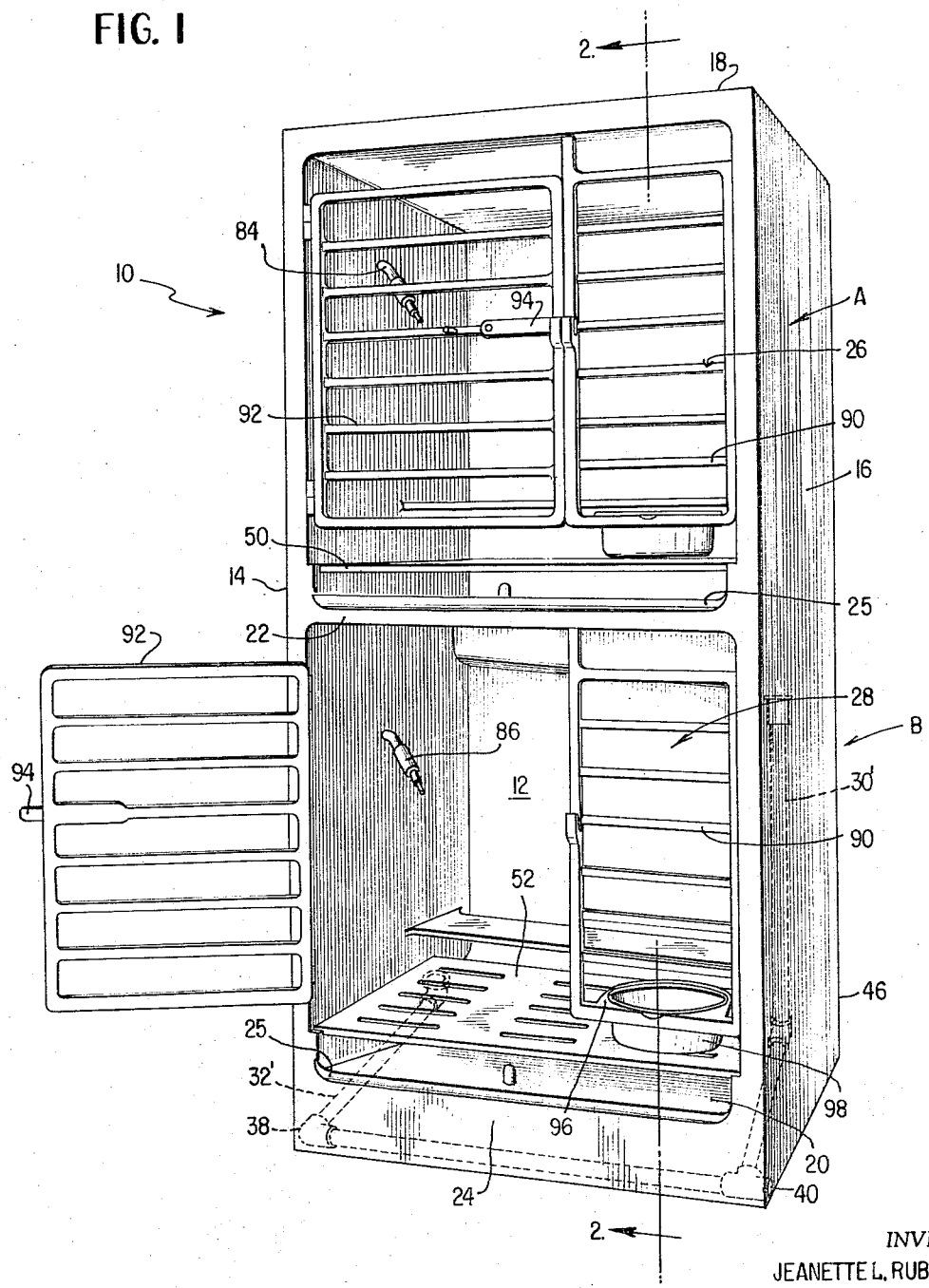
FIG. 1 is a perspective view of a small animal housing unit constructed in accordance with the teachings of the present invention.

Referring to the drawings, 10 generally designates an embodiment of the small animal housing unit of the invention including an upper section A and a lower section B. The housing unit generally comprises a back wall 12, side walls 14 and 16, top wall 18, lower floor member 20, partition member 22, front skirt member 24, and separate grille means 26 and 28.

The rearward end of the floor member 20 and the partition member 22 are shaped to provide a pair of troughs 30 and 32 which troughs extend across the back of the housing unit adjacent the back wall 12 thereof. The trough 30 is sloped downwardly from, for example, side wall 14 to side wall 16 to internal drain pipe 30' in the illustrated form of the invention, while trough 32 slopes in the opposite direction to internal drain pipe 32'. Drain pipes 30' and 32' are connected to internal cross pipe 33 which extends across the front of the cages in the front skirt member 24.

As more clearly shown in FIG. 2, the upper surface 34 of the floor member 20 and the upper surface 36 of the partition member 22 slope from the front edges thereof downwardly and rearwardly into the respective troughs 30 and 32.

The forward or front edges 25 of each floor projects beyond the front of its cage unit and has an upturned lip to reduce splash of waste and the like from the cages to the surrounding area.

Further, as illustrated in the drawings, one or both of the side walls 14 and 16 may be provided with openings generally designated 38 and 40 which communicate with the cross pipe 33 whereby the material collected therein may be suitably disposed of and at the lower end 16. While a common pipe 33 from an adjacently positioned cage may empty into the common pipe 33 as to be more fully described hereinafter. Where only a single housing unit is employed or where the housing units are to be positioned in spaced apart relationship, the opening 38 in the side wall 14 is sealed or the housing units are constructed without said opening whereby only the lower end of the pipe 33 has communication with the outer surface of side wall 16 of the housing units for connection to a sewer.

In constructing the small animal housing unit, the top, side and back walls, the transverse partition member, the floor member and the front skirt are cast, molded or formed as a single unit, thereby eliminating cracks and crevices where these elements would normally be joined one to another. The outer surface of the housing unit is preferably molded from a lightweight strong plastic material such as an epoxy resin, a polyester reinforced with fiberglass or polypropylene. This constitutes a tough outer skin 46 for the cages. The skin is then embedded in a lightweight plastic foam such as polystyrene or polyurethane foam. It is also possible to mold the polystyrene foam and place the skin on as a surface coating on the foam.

The combination of the foam plastic interior with a plastic skin on the interior and exterior surfaces thereof provides a rigid, lightweight unit which may be conveniently manufactured and insures extended period of carefree use. Although the cage is preferably constructed of plastic, the design lends itself to fabrication with metal such as stainless steel.

Preferably, each of the cages A and B is provided with a false bottom 50 and 52, respectively. The false bottoms 50 and 52 may be constructed of perforated or expanded metal or, preferably, a slotted sheet of reinforced fiberglass or the like. Each of the false bottoms 50 and 52 extends from L-shaped brackets 54 formed along each of the side walls 14 and 16. As more clearly illustrated in FIGS. 2 and 3, the false floors 50 and 52 terminate just short of the forward edge of each of the troughs 30 and 32 whereby foreign matter may be flushed from the false floors into the respective troughs.

A platform 60 and 62 is provided in each of the cages A and B with the platforms extending generally between the side walls 14 and 16 adjacent the rear wall 12 and above the false floors 50 and 52, respectively. The platforms 60 and 62 are constructed of metal or plastic. If the platforms 60 and 62 are cast of metal the side edges of the platforms are coved into the side walls of the cage. The platforms may be secured in place by countersunk belts or screws.

The platforms 60 and 62 are spaced such that the most rearward edge 66 of each of the platforms is spaced from the inner surface of the back wall to facilitate the cleaning of the cages and to reduce to a minimum areas where foreign matter may collect. Further, each platform is spaced above its respective trough a distance to permit cleaning of the cages while at the same time that will keep the housed animals out of the troughs.

In the preferred form of the invention, the floor member 20 and the partition member 22 are cast with pipe or conduit means 70 and 72 therein just rearwardly of the leading edges of these members. Each of the pipe means 70 and 72 communicates with a novel irrigating nozzle means generally designated 74 and 76. Irrigation nozzles 74 and 76 have arcuate, slot-like water outlets whereby when the pipes 70 and 72 are connected to a source of water under pressure, a spray of flushing liquid is directed substantially entirely across the upper sloping surfaces 34 and 36 of the floor member 20 and the partition member 22. This flushing liquid cleanses these surfaces and drains into the troughs 30 and 32. By using arcuate, slot-like outlets for the irrigating nozzles 74 and 76, the sloping floors 34 and 36 may be flushed without disturbing animals on the false floors 50 and 52 or on the platforms 60 or 62 in cages A or B.

As more clearly illustrated in FIGS. 2 and 3, a further water conducting pipe system generally designated 80 is cast in the foam walls of the housing unit. The water conducting pipe unit 80 is connected to a source of drinking water under pressure via conduit 82 shown in FIG. 2 of the drawings.

The water conducting unit 80 is connected to a pair of animal actuatable drinking units 84 and 86 in cages A and B, respectively. The animal actuated drinking units are of conventional design and may be constructed as shown in U.S. Patent 2,939,424 whereby when an animal licks the downwardly projecting elements 88, water drips from the end thereof into the animal's mouth.

Each of the grilles 26 and 28 includes a fixed portion 90 and a pivotally mounted door portion 92 with cooperating latch means 94 for latching the pivotally mounted door portions 92 to the fixed grille portions 90. In the illustrated form of the invention, the fixed grille portions and the pivotally mounted door portions 92 are of cast construction and each of the bars are smoothly faired into the longitudinally extending members of the grille. The fixed and door portions of the grille units may be cast of, for example, aluminum or plastic. Where a metal such as iron is employed in constructing the grille units the cast units are then preferably plastic coated to prevent rusting.

As shown in the drawings, the fixed grille units 90 may include a small platform 96 provided with an opening therein adapted to receive a feeding bowl or dish 98. Supporting the food bowl or dish 98 in the opening in the platform 96 reduces food spillage and permits feeding of the animal without opening the cage door 92.

As hereinbefore discussed, a plurality of the small animal housing units may be arranged in side-by-side relationship with the common drain pipe 33 of each of the units positioned in waste transferring relationship. Where a plurality of the units are to be so assembled, the common drain pipe 33 of one housing unit is aligned with the common drain pipe of its neighbor when the neighboring housing unit is raised, for example, one inch to account for the one-inch slope in the common drain pipe 33.

Further, where a plurality of the housing units are assembled in side-by-side relationship, the cracks between adjacent cages are preferably sealed with either, for example, a Mylar pressure sensitive adhesive tape where a non-permanent installation is desired, or the cracks may be sealed with a fiberglass strip covered with an epoxy cement or a liquid polyester adhesive.

From the foregoing description it will be seen that the present invention fully accomplishes the aims and objects hereinbefore set forth. It will be appreciated that various modifications may be made in the form of the structures shown in the drawings and described herein without departing from the scope of the present invention. For example, in the illustrated form of the invention, each of the housing units comprises a pair of cages A and B; however, where particularly small animals such as rabbits and cats or the like are to be housed, it will be appreciated that each unit may be conveniently made three cages high without departing from the teachings of the present invention.

I claim:

1. A small animal housing unit comprising top, side and back walls, a lower floor member formed with said back and side walls and spaced from the lower extremities thereof, a generally transverse partition member formed with the side and back walls and spaced intermediate the top and lower floor member to form upper and lower cages, said top, side and back walls and said floor and partition members being formed from an expanded foam plastic composition with the interior and exterior surfaces thereof coated with an impervious sheet material, a trough integrally formed in the floor member and in the partition member, said troughs extending across the back wall of the housing and sloping toward opposite side walls, pipe means having one end connected to the lower end of each of said troughs, a common drain pipe extending across the front of the lower cage of the housing unit, means connecting the other end of each of said pipe means to said common drain pipe, said pipe means and said common drain pipe being formed within the expanded foam plastic composition during formation of said top, side and back walls and said floor and partition members, an opening through one of the side walls communicating with at least the lower end of the common drain pipe, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

2. A small animal housing unit made of expanded foam plastic composition comprising top, side and back walls, a lower floor member formed with said back and side walls and spaced from the lower extremities thereof, a generally transverse partition member formed with the side and back walls and spaced intermediate the top and lower floor member to form upper and lower cages, a trough formed in the floor member and in the partition member, said troughs extending across the back wall of the housing and sloping toward opposite side walls, a common drain pipe extending across the front of the lower cage, pipe means connecting the lower end of each trough with said common drain pipe, said pipe means and said common drain pipe being formed within the expanded foam plastic composition during the formation of said top, side and back walls and said floor and partition members, a perforated false floor positioned above the floor member and partition member, said false floors terminating at the rearward ends of the partition member and the floor member adjacent the forward edges of the troughs formed therein, a lip portion projecting outwardly from the forward edge of said floor member and said partition member and having an upturned leading edge, an opening through one of the side walls communicating with at least the lower end of the common drain pipe, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

References Cited by the Examiner

UNITED STATES PATENTS

| | | | |
|---|---|---|---|
| 1,840,202 | 1/1932 | Kerr | 119—17 |
| 2,523,615 | 9/1950 | Fell | 119—22 |
| 2,701,547 | 2/1955 | Shaw | 119—22 |
| 3,177,848 | 4/1965 | Rubricius | 119—17 |

SAMUEL KOREN, *Primary Examiner.*

HUGH R. CHAMBLEE, *Examiner.*

UNITED STATES PATENT OFFICE
CERTIFICATE OF CORRECTION

Patent No. 3,292,582                                            December 20, 1966

Jeanette L. Rubricius

It is hereby certified that error appears in the above numbered patent requiring correction and that the said Letters Patent should read as corrected below.

In the heading to the printed specification, lines 3 and 4, for "Jeanette L. Rubricius, 85-35 Midland Parkway, Jamaica, N. Y. 11432" read -- Jeanette L. Rubricius, Jamaica, N. Y., assignor to Venride, Inc., Long Branch, N. J., a corporation of New York --.

Signed and sealed this 26th day of September 1967.

(SEAL)
Attest:

ERNEST W. SWIDER                                     EDWARD J. BRENNER
Attesting Officer                                             Commissioner of Patents